(12) United States Patent 
Hazenberg et al.

(10) Patent No.: US 11,154,117 B2
(45) Date of Patent: Oct. 26, 2021

(54) SPACER TEXTILE MATERIALS AND METHODS FOR MANUFACTURING THE SPACER TEXTILE MATERIALS

(71) Applicant: NIKE, Inc., Beaverton, OR (US)

(72) Inventors: Klaas P. Hazenberg, Guangzhou (CN); Kirvan L. Chao, Portland, OR (US); Yu Hui Wang, Dou-Liu (TW); Tim Chen, Chia-I (TW)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/544,378

(22) Filed: Aug. 19, 2019

(65) Prior Publication Data

US 2019/0365043 A1 Dec. 5, 2019

Related U.S. Application Data

(63) Continuation of application No. 15/164,106, filed on May 25, 2016, now Pat. No. 10,398,194, which is a
(Continued)

(51) Int. Cl.
*B32B 5/06* (2006.01)
*B32B 7/08* (2019.01)
(Continued)

(52) U.S. Cl.
CPC ............ *A43B 13/203* (2013.01); *A43B 13/20* (2013.01); *B32B 5/06* (2013.01); *B32B 7/08* (2013.01);
(Continued)

(58) Field of Classification Search
CPC ..... Y10T 428/24479; Y10T 428/24488; Y10T 428/24562; Y10T 428/24612;
(Continued)

(56) References Cited

U.S. PATENT DOCUMENTS 1,088,328 A 2/1914 Cucinotta
2,743,510 A 5/1956 Mauney et al.
(Continued)

FOREIGN PATENT DOCUMENTS

CN 1491090 A 4/2004
CN 1878484 A 12/2006
(Continued)

OTHER PUBLICATIONS

Machine translation (Espacent) of EP 0897029 A2. Translated Aug. 29, 2020. (Year: 2020).*
(Continued)

*Primary Examiner* — Frank J Vineis
*Assistant Examiner* — Ethan A. Utt
(74) *Attorney, Agent, or Firm* — Honigman LLP; Matthew H. Szalach; Jonathan O'Brien

(57) ABSTRACT

A spacer textile material may include a first layer, a second layer, and a plurality of connecting members extending between and joining the first layer and the second layer. The connecting members may form a series of at least ten rows that are separated by spaces. The rows have a width that is less than a width of the spaces, and the connecting members form at least one stabilizing row with a width that is greater than the width of the spaces.

20 Claims, 14 Drawing Sheets

Related U.S. Application Data continuation of application No. 13/443,421, filed on Apr. 10, 2012, now Pat. No. 9,375,049.

(51) Int. Cl.
*A43B 13/20* (2006.01)
*D04B 21/16* (2006.01)

(52) U.S. Cl.
CPC ............ *D04B 21/16* (2013.01); *D04B 21/165* (2013.01); *B32B 2437/02* (2013.01); *D10B 2403/0122* (2013.01); *D10B 2403/021* (2013.01); *D10B 2501/043* (2013.01); *Y10T 428/24744* (2015.01)

(58) Field of Classification Search
CPC ..... Y10T 428/24744; Y10T 428/24777; Y10T 428/24785; Y10T 442/40; Y10T 442/414; Y10T 442/488; Y10T 442/30; Y10T 442/3008; Y10T 442/3024; Y10T 442/3472; B32B 3/00; B32B 3/02; B32B 3/26; B32B 3/263; B32B 5/00; B32B 5/02; B32B 5/024; B32B 5/026; B32B 5/04; B32B 5/06; B32B 5/22; B32B 5/24; B32B 5/26; B32B 2437/00; B32B 2437/02; D04B 1/00; D04B 1/10; D04B 1/102; D04B 1/106; D04B 1/12; D04B 1/14; D04B 1/16; D04B 1/18; D04B 1/22; D04B 1/24; D10B 2403/00; D10B 2403/02; D10B 2403/021; D10B 2403/022; D10B 2403/023; D10B 2501/00; D10B 2501/04; D10B 2501/043; D03D 1/00; D03D 5/00; D03D 7/00; D03D 11/00; D03D 15/00; D03D 15/0044; D03D 15/08; D03D 25/00; D03D 25/005; D03D 2700/00; D03D 2700/01; D03D 2700/0103; D03D 2700/0111; D03D 2700/0133; A43B 1/00; A43B 13/00; A43B 13/02; A43B 13/023; A43B 13/12; A43B 13/125; A43B 13/127; A43B 13/14; A43B 13/141; A43B 13/143; A43B 13/145; A43B 13/146; A43B 13/148
USPC ....... 428/156, 157, 166, 172, 188, 192, 193; 442/304, 306, 318, 181, 182, 184, 239; 66/169, 169 R, 170, 171, 196, 197, 202; 139/383 R, 384 R, 408–415, 420 R, 421, 139/423, 426 R, 383 B; 36/83, 84, 102, 36/105, 113, 9 R, 25 R, 28, 29, 30 R, 36/34 R, 35 R, 37, 35 B, 43, 44
See application file for complete search history.

(56) References Cited

U.S. PATENT DOCUMENTS

| | | | |
|---|---|---|---|
| 3,015,148 A | 1/1962 | Haddad |
| 3,205,106 A | 9/1965 | Cross |
| 3,253,355 A | 5/1966 | Menken |
| 3,359,610 A | 12/1967 | Faircloth |
| 3,984,926 A | 10/1976 | Calderon |
| 4,025,974 A | 5/1977 | Lea et al. |
| 4,183,156 A | 1/1980 | Rudy |
| 4,219,945 A | 9/1980 | Rudy |
| 4,287,250 A | 9/1981 | Rudy |
| 4,340,626 A | 7/1982 | Rudy |
| 4,364,188 A | 12/1982 | Turner et al. |
| 4,397,104 A | 8/1983 | Doak |
| 4,409,271 A | 10/1983 | Pehr |
| 4,513,449 A | 4/1985 | Donzis |
| 4,619,055 A | 10/1986 | Davidson |
| 4,761,321 A | 8/1988 | McCall et al. |
| 4,874,640 A | 10/1989 | Donzis |
| 4,906,502 A | 3/1990 | Rudy |
| 4,936,029 A | 6/1990 | Rudy |
| 5,042,176 A | 8/1991 | Rudy |
| 5,083,361 A | 1/1992 | Rudy |
| 5,134,790 A | 8/1992 | Woitschaetzke et al. |
| 5,167,999 A | 12/1992 | Wang |
| 5,369,896 A | 12/1994 | Frachey et al. |
| 5,385,036 A | 1/1995 | Spillane et al. |
| 5,543,194 A | 8/1996 | Rudy |
| 5,552,205 A | 9/1996 | Lea |
| 5,572,804 A | 11/1996 | Skaja et al. |
| 5,589,245 A | 12/1996 | Roell |
| 5,630,237 A | 5/1997 | Ku |
| 5,713,141 A | 2/1998 | Mitchell et al. |
| 5,741,568 A | 4/1998 | Rudy |
| 5,744,222 A | 4/1998 | Sugihara |
| 5,802,739 A | 9/1998 | Potter et al. |
| 5,918,383 A | 7/1999 | Chee |
| 5,952,065 A | 9/1999 | Mitchell et al. |
| 5,987,781 A | 11/1999 | Pavesi et al. |
| 5,993,585 A | 11/1999 | Goodwin et al. |
| 6,013,340 A | 1/2000 | Bonk et al. |
| 6,029,962 A | 2/2000 | Shorten et al. |
| 6,041,521 A | 3/2000 | Wong |
| 6,082,025 A | 7/2000 | Bonk et al. |
| 6,098,313 A | 8/2000 | Skaja |
| 6,119,371 A | 9/2000 | Goodwin et al. |
| 6,127,010 A | 10/2000 | Rudy |
| 6,127,026 A | 10/2000 | Bonk et al. |
| 6,321,465 B1 | 11/2001 | Bonk et al. |
| 6,385,864 B1 | 5/2002 | Sell, Jr. et al. |
| 6,668,740 B2 | 12/2003 | Kawamura et al. |
| 6,755,052 B1 | 6/2004 | Sytz |
| 6,758,068 B2 | 7/2004 | Shirasaki et al. |
| 6,770,581 B1 | 8/2004 | DeMott et al. |
| 6,830,793 B2 | 12/2004 | Hawkins et al. |
| 6,837,951 B2 | 1/2005 | Rapaport |
| 7,060,156 B2 | 6/2006 | Mack et al. |
| 7,070,845 B2 | 7/2006 | Thomas et al. |
| 7,131,218 B2 | 11/2006 | Schindler |
| 7,174,750 B2 | 2/2007 | Shirasaki et al. |
| 7,213,421 B2 | 5/2007 | Shirasaki et al. |
| 7,418,837 B2 | 9/2008 | Muller et al. |
| 7,707,743 B2 | 5/2010 | Schindler et al. |
| 7,774,955 B2 | 8/2010 | Goodwin et al. |
| 7,913,520 B1 | 3/2011 | Chen et al. |
| 8,151,486 B2 | 4/2012 | Dua |
| 8,241,451 B2 | 8/2012 | Rapaport et al. |
| 8,365,412 B2 | 2/2013 | Weber et al. |
| 8,394,221 B2 | 3/2013 | Rapaport et al. |
| 8,747,593 B2 | 6/2014 | Chao et al. |
| 9,375,049 B2 | 6/2016 | Hazenberg et al. |
| 9,801,428 B2 | 10/2017 | Taylor et al. |
| 10,398,194 B2* | 9/2019 | Hazenberg ........... D04B 21/165 |
| 2002/0121031 A1 | 9/2002 | Smith et al. |
| 2003/0096548 A1 | 5/2003 | Groitzsch et al. |
| 2003/0097767 A1 | 5/2003 | Perkinson |
| 2005/0039346 A1 | 2/2005 | Thomas et al. |
| 2005/0097777 A1 | 5/2005 | Goodwin |
| 2007/0169379 A1 | 7/2007 | Hazenberg et al. |
| 2007/0212959 A1 | 9/2007 | Johnson |
| 2009/0288312 A1 | 11/2009 | Dua |
| 2009/0288313 A1 | 11/2009 | Rapaport et al. |
| 2009/0300949 A1 | 12/2009 | Frederick et al. |
| 2011/0131831 A1 | 6/2011 | Peyton et al. |
| 2012/0233879 A1 | 9/2012 | Dojan et al. |
| 2012/0233880 A1 | 9/2012 | Chao et al. |
| 2013/0263391 A1 | 10/2013 | Chao et al. |
| 2013/0266773 A1 | 10/2013 | Hazenberg et al. |

FOREIGN PATENT DOCUMENTS

| | | |
|---|---|---|
| CN | 100434008 C | 11/2008 |
| CN | 101984175 A | 3/2011 |
| CN | 102123623 A | 7/2011 |
| DE | 10013492 A1 | 9/2001 |

(56) References Cited

FOREIGN PATENT DOCUMENTS

| | | |
|---|---|---|
| DE | 10260694 A1 | 6/2004 |
| EP | 0897029 A2 | 2/1999 |
| EP | 1775362 A1 | 4/2007 |
| JP | S6357905 U | 4/1988 |
| JP | 2008521657 A | 6/2008 |
| WO | WO-03045181 A1 | 6/2003 |
| WO | WO-2005018363 A1 | 3/2005 |
| WO | WO-2010133877 A1 | 11/2010 |
| WO | WO-2013155086 A2 | 10/2013 |
| WO | WO-2014025951 A1 | 2/2014 |

OTHER PUBLICATIONS

"Biomechanics of Foot Strikes & Applications to Running Barefoot or in Minimal Footwear", Running Barefoot & Traing Tips section, Harvard. Archived Mar. 14, 2011. web.archive.org/web/20110314134925/http://www.barefootrunning.fas.harvard.edu/5BarefootRunning&TrainingTips.html.
"Shoe size", Wikipedia, archived Mar. 30, 2011. web.archive.org/web/20110330053719/http://en.wikipedia.org/wiki/Shoe_size.
European Patent Office, Extended European Search Report for EP Application No. 15001734.1, dated Oct. 21, 2015.
International Searchng Authority, International Search Report and Written Opinion dated Nov. 22, 2013 in PCT/US2013/054042.
USPTO, Restriction Requirement dated Oct. 18, 2013 in U.S. Appl. No. 13/571,749.
Response to Restriction Requirement filed Nov. 18, 2013 in U.S. Appl. No. 13/571,749.
Invitation to Pay Additional Fees and, Where Applicable, Protest Fee (with Search Report) dated Nov. 18, 2013 in PCT Application No. PCT/US2013/035804.
USPTO, Notice of Allowance dated Feb. 5, 2014 in U.S. Appl. No. 13/571,749.
International Searching Authority, International Search Report and Written Opinion dated Apr. 10, 2014 in PCT/US2013/035804.
International Searching Authority, International Preliminary Report on Patentability (including Written Opinion of the ISA) dated Oct. 14, 2014 in PCT/US2013/035804.
Korean Patent Office, Korean Office Action for Application No. 10-2015-7006194, dated May 27, 2016.
State Intellectual Property Office, Chinese Office Action for Application No. 20160341041.6, dated May 2, 2017.
European Patent Office, Extended European Search Report for EP Application No. 17001667.9, dated Apr. 5, 2018.
State Intellectual Property Office (PRC), Office Action for CN Application No. 201710027970.4, dated May 3, 2018.
European Patent Office, Extended European Search Report for EP Application No. 18188870.2, dated Jan. 2, 2019.
USPTO, Final Office Action for U.S. Appl. No. 15/164,106, dated Aug. 10, 2018.
USPTO, Non-Final Office Action for U.S. Appl. No. 15/164,106, dated Jan. 26, 2018.
USPTO, Notice of Allowance for U.S. Appl. No. 15/164,106, dated Apr. 26, 2019.
European Patent Office, Extended European Search Report for EP Application No. 19162486.5, dated Aug. 27, 2019.
European Patent Office, Communication pursuant to Article 94(3) EPC. for EP Application No. 18 188 870.0 dated Feb. 26, 2021.

\* cited by examiner

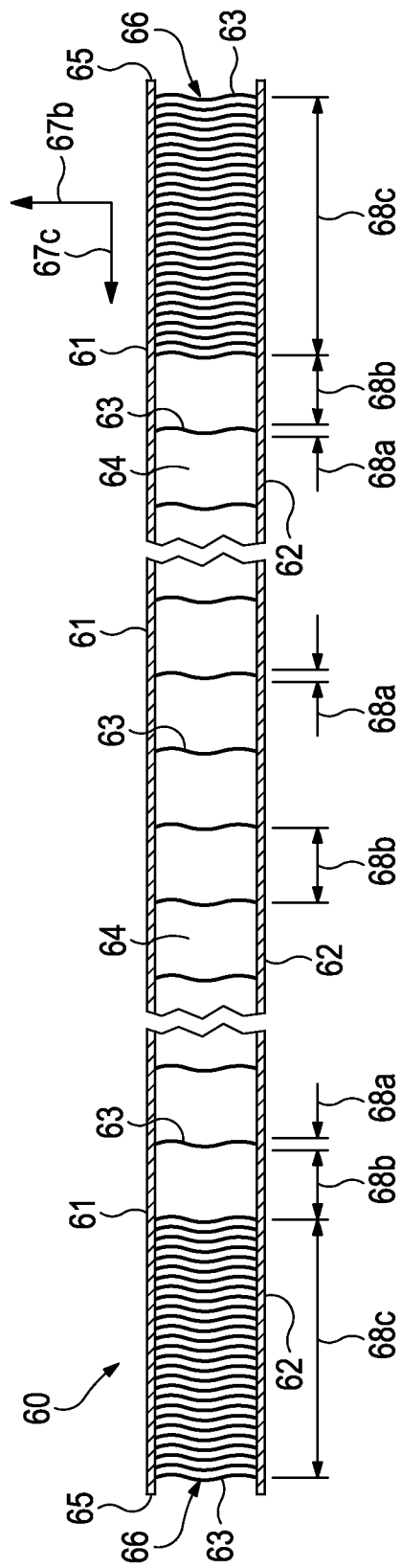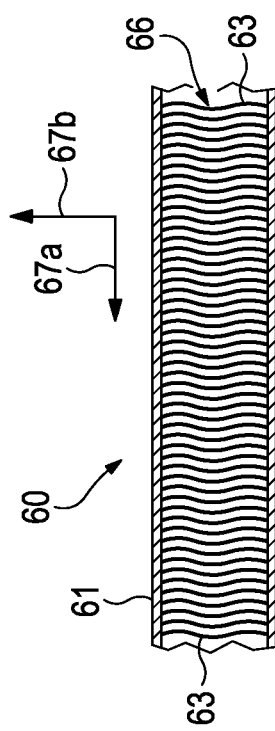
Figure 10A
Figure 10B

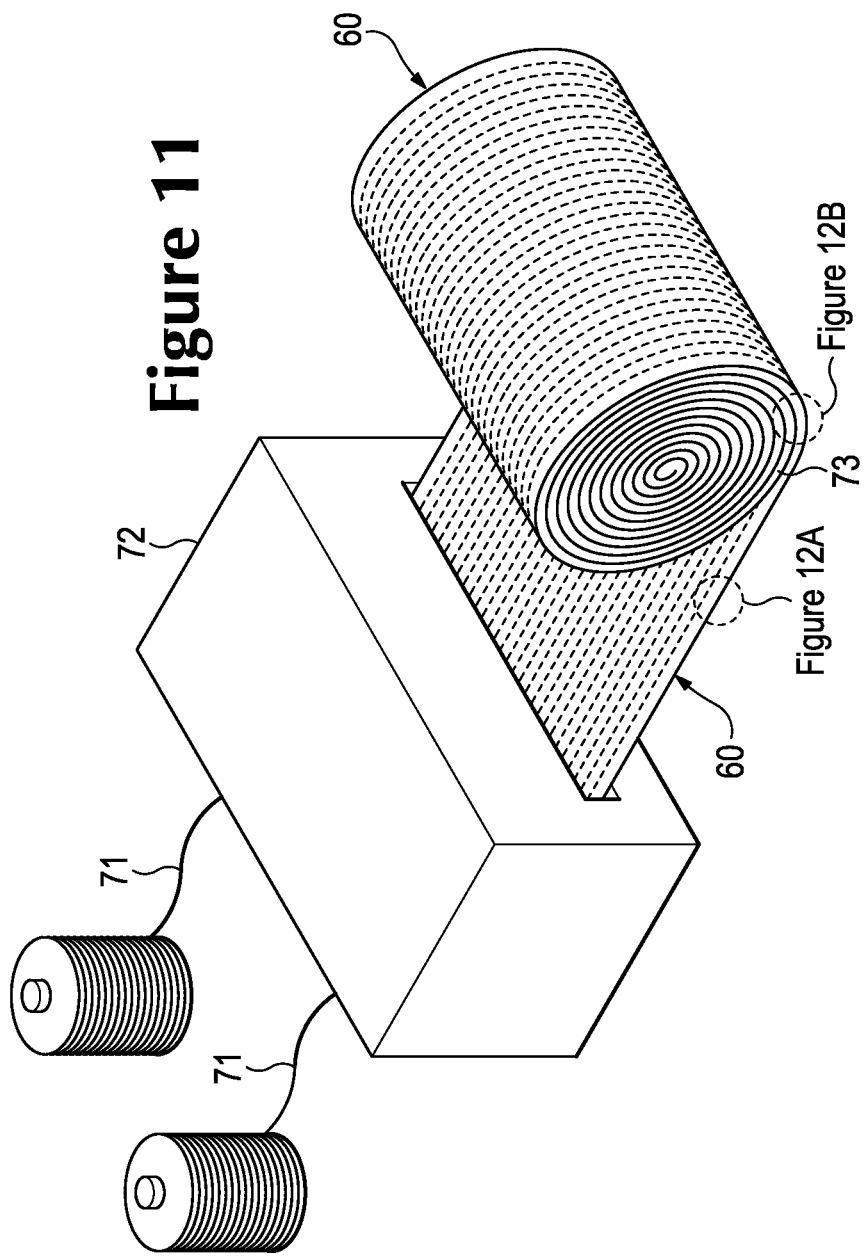

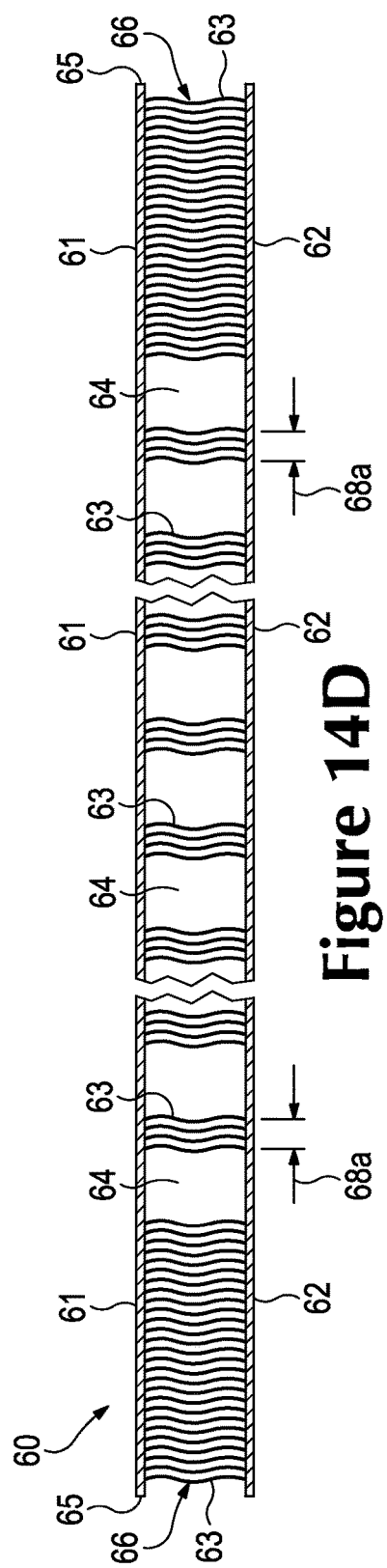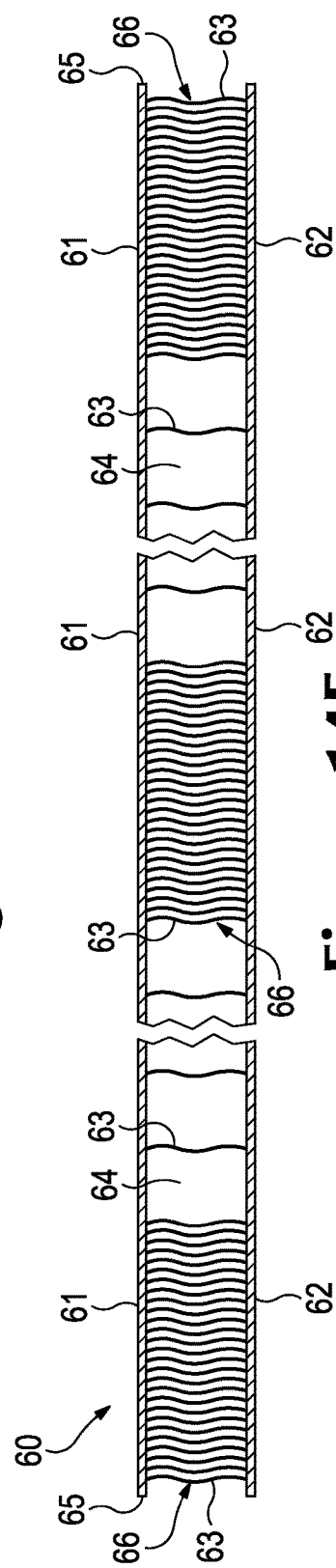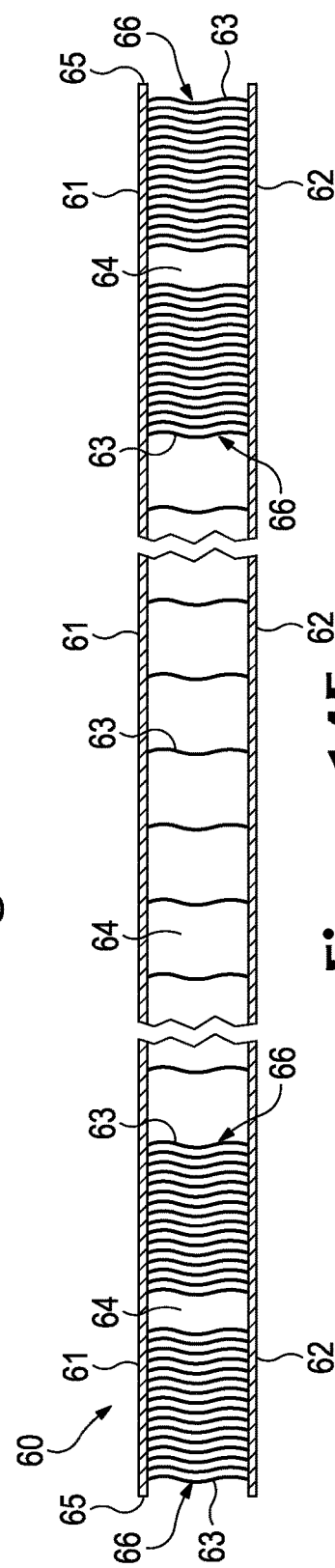

SPACER TEXTILE MATERIALS AND METHODS FOR MANUFACTURING THE SPACER TEXTILE MATERIALS

CROSS REFERENCE TO RELATED APPLICATIONS

This application is a Continuation of U.S. patent application Ser. No. 15/164,106, filed May 25, 2016, which is a Continuation of U.S. patent application Ser. No. 13/443,421, filed Apr. 10, 2012, the entire contents of which are hereby incorporated by reference.

BACKGROUND

Articles of footwear generally include two primary elements: an upper and a sole structure. The upper is often formed from a plurality of material elements (e.g., textiles, polymer sheet layers, polymer foam layers, leather, synthetic leather) that are stitched or adhesively bonded together to form a void within the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust fit of the footwear, as well as permitting entry and removal of the foot from the void within the upper. In addition, the upper may include a tongue that extends under the lacing system to enhance adjustability and comfort of the footwear, and the upper may incorporate a heel counter for stabilizing the heel area of the foot.

The sole structure is secured to a lower portion of the upper and positioned between the foot and the ground. In athletic footwear, for example, the sole structure often includes a midsole and an outsole. The midsole may be formed from a polymer foam material that attenuates ground reaction forces (i.e., provides cushioning) during walking, running, and other ambulatory activities. The midsole may also include fluid-filled chambers, plates, moderators, or other elements that further attenuate forces, enhance stability, or influence the motions of the foot, for example. In some configurations, the midsole may be primarily formed from a fluid-filled chamber. The outsole forms a ground-contacting element of the footwear and is usually fashioned from a durable and wear-resistant rubber material that includes texturing to impart traction. The sole structure may also include a sockliner positioned within the void of the upper and proximal a lower surface of the foot to enhance footwear comfort.

SUMMARY

A spacer textile material may include a first layer, a second layer, and a plurality of connecting members extending between and joining the first layer and the second layer. The connecting members may form a series of at least ten rows that are separated by spaces. The rows have a width that is less than a width of the spaces, and the connecting members form at least one stabilizing row with a width that is greater than the width of the spaces.

A method for manufacturing a spacer textile material may include utilizing a knitting process to form a first layer and a second layer that are at least partially coextensive with each other. A plurality of connecting members are formed that extend between and join the first layer and the second layer. The connecting members are arranged in rows separated by spaces where the connecting members are absent, and the rows having a first width. Additionally, at least one of the rows is structured to be a stabilizing row with a second width, the first width being less than the second width.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIGS. 10A and 10B are cross-sectional views of the spacer textile material, as defined by section lines 10A and 10B in FIG. 9.

FIG. 11 is a schematic perspective view of a process for manufacturing a spacer textile material that may be utilized in the chamber.

FIGS. 14A-14H are cross-sectional views corresponding with FIG. 10A and depicting further configurations of the spacer textile material.

DETAILED DESCRIPTION

The following discussion and accompanying figures disclose various configurations of stabilized spacer textile materials and methods for manufacturing the spacer textile materials. As an example, the spacer textile material, or a portion of the spacer textile material, is disclosed as being incorporated into a fluid-filled chamber. Although the chamber is disclosed with reference to footwear having a configuration that is suitable for running, concepts associated with the chamber may be applied to a wide range of athletic footwear styles, including basketball shoes, cross-training shoes, football shoes, golf shoes, hiking shoes and boots, ski and snowboarding boots, soccer shoes, tennis shoes, and walking shoes, for example. Concepts associated with the chamber may also be utilized with footwear styles that are generally considered to be non-athletic, including dress shoes, loafers, sandals, and work boots. In addition to footwear, the chambers may be incorporated into other types of apparel and athletic equipment, including helmets, gloves, and protective padding for sports such as football and hockey. Similar chambers may also be incorporated into cushions and other compressible structures utilized in household goods and industrial products. Additionally, the discussion and figures disclose various configurations of a spacer textile material. Although portions of the spacer textile material are disclosed as being incorporated into the chamber, the spacer textile material may be utilized with a variety of other products or for a variety of other purposes.

General Footwear Structure

Figure 1:
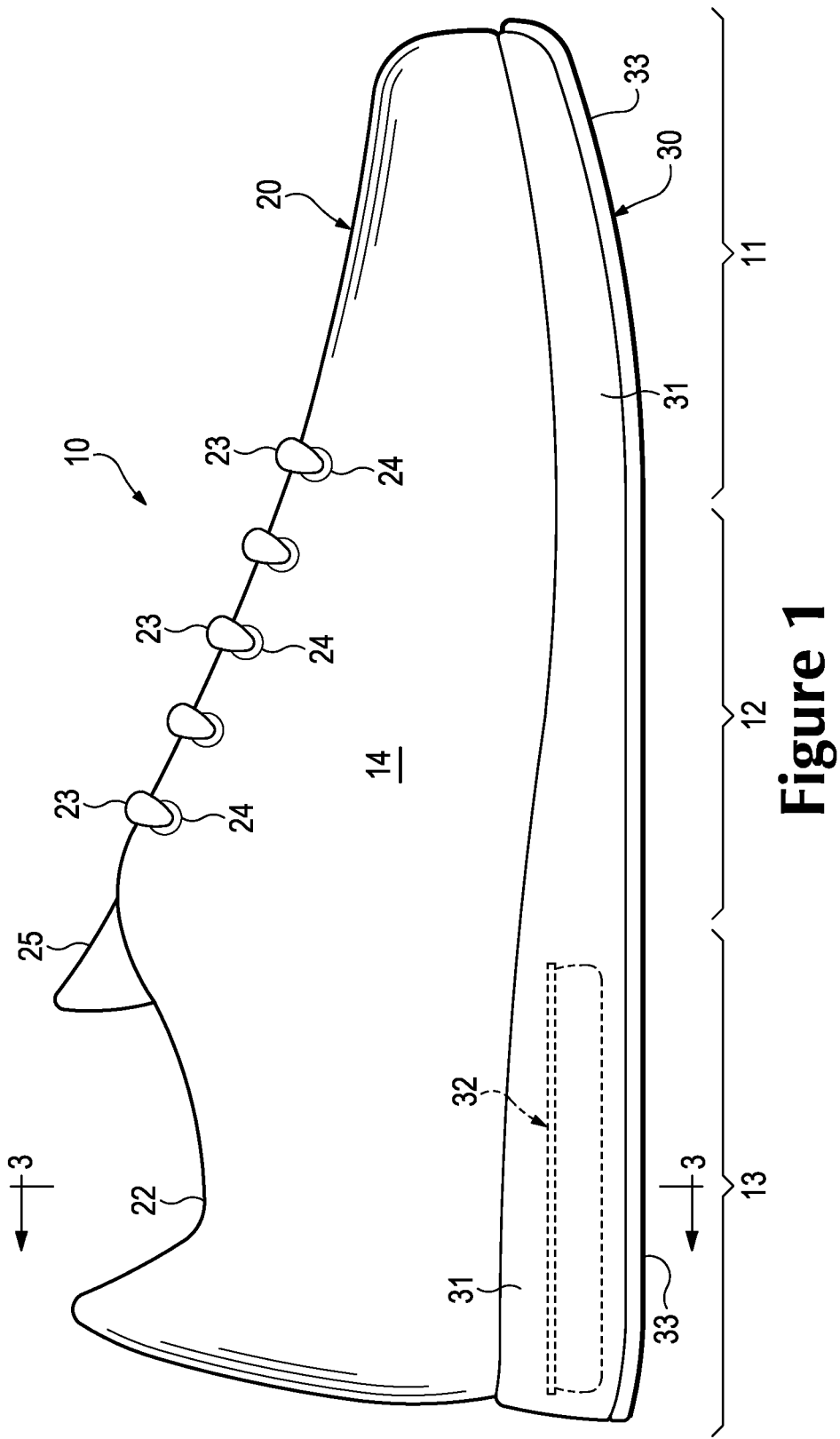
FIG. 1 is a lateral side elevational view of an article of footwear incorporating a fluid-filled chamber.
Figure 2:
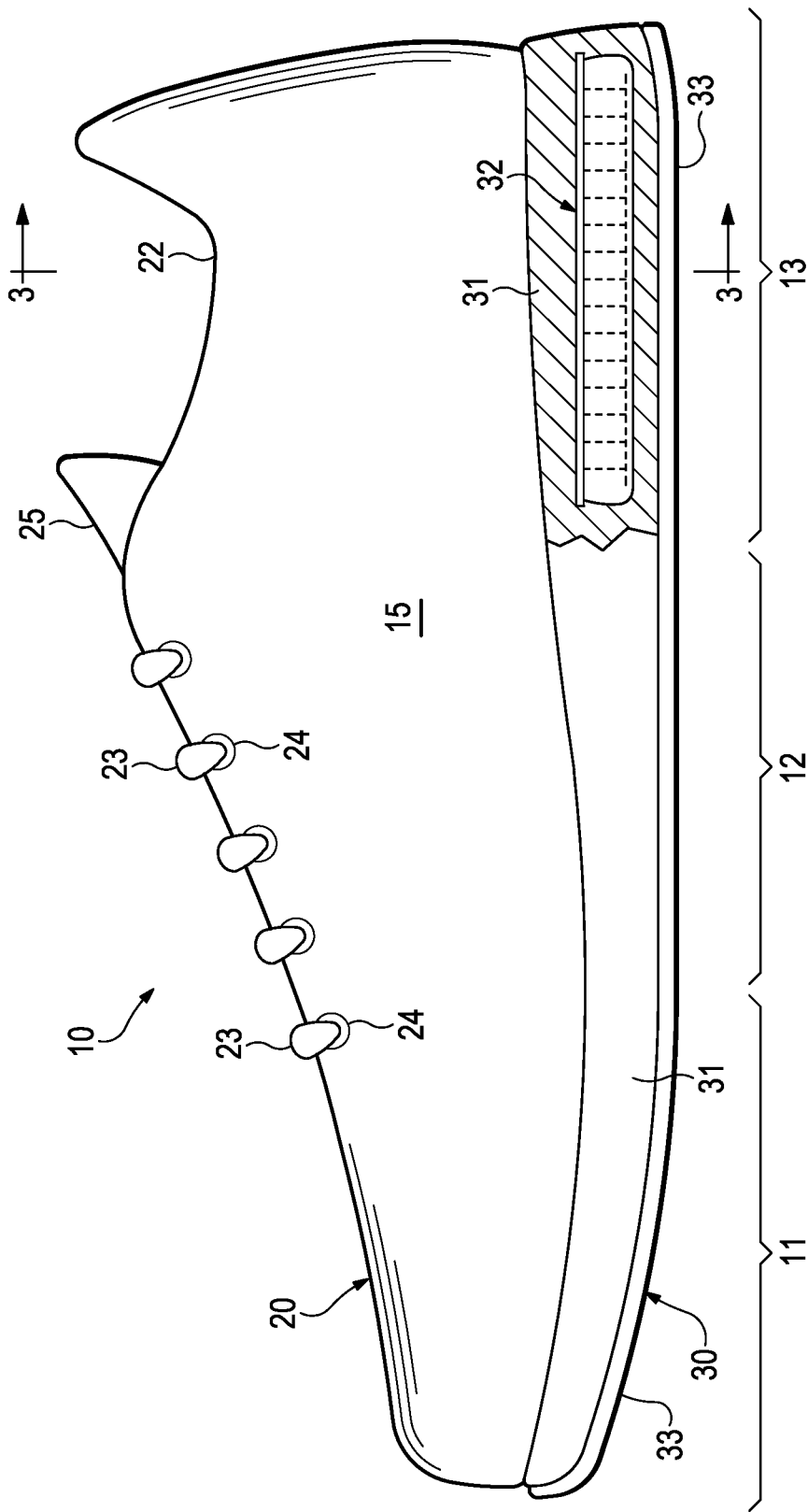
FIG. 2 is a medial side elevational view of the article of footwear.
Figure 3:
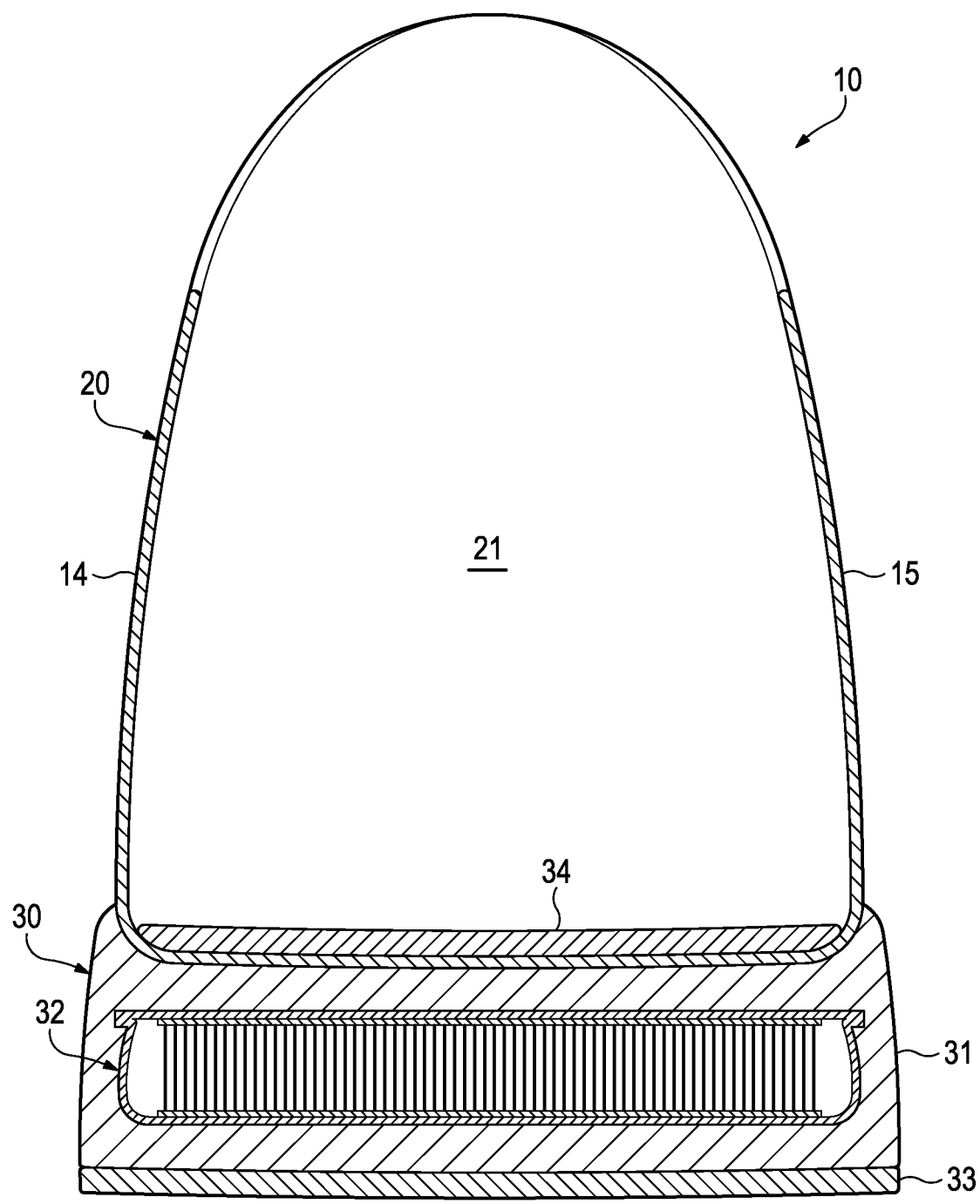
FIG. 3 is a cross-sectional view of the article of footwear, as defined by section line 3 in FIGS. 1 and 2.
Figure 4:
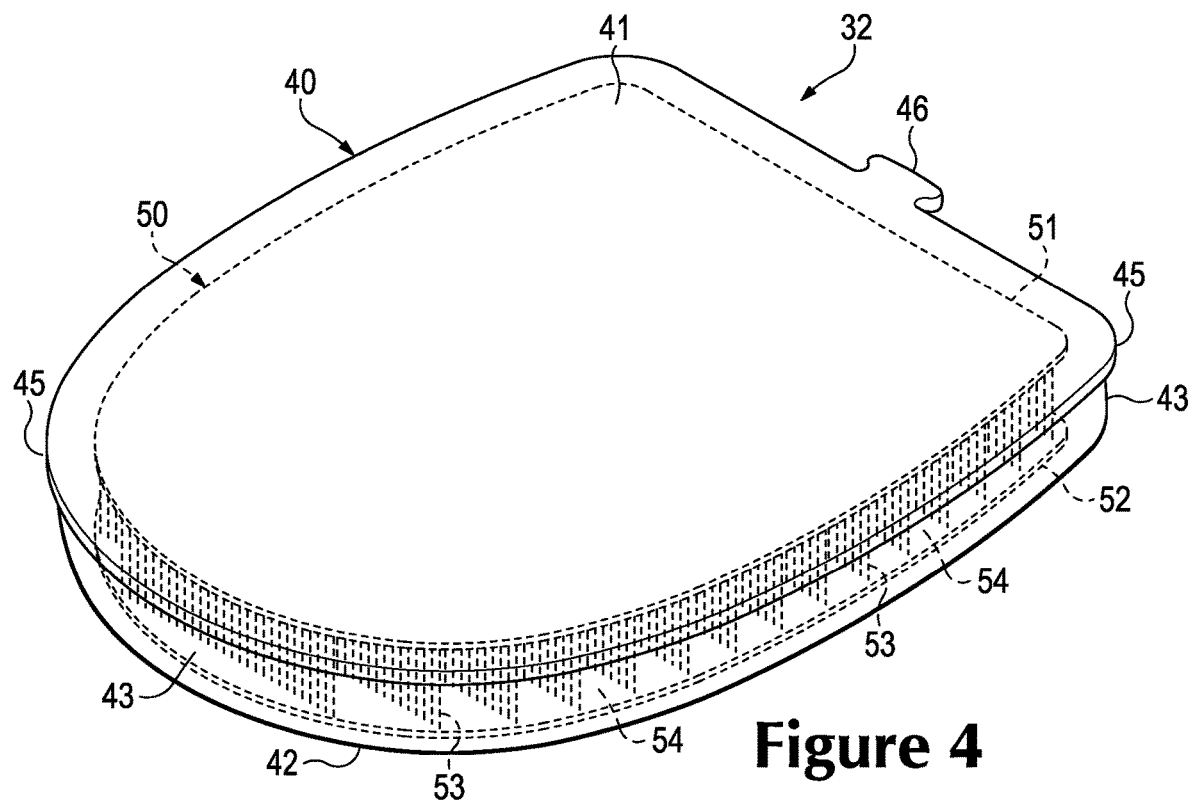
FIG. 4 is a perspective view of the chamber.

An article of footwear 10 is depicted in FIGS. 1-3 as including an upper 20 and a sole structure 30. Upper 20 provides a comfortable and secure covering for a foot of a wearer. As such, the foot may be located within upper 30 to effectively secure the foot within footwear 10. Sole structure 30 is secured to a lower area of upper 20 and extends between upper 20 and the ground. When the foot is located within upper 20, sole structure 30 extends under the foot to attenuate ground reaction forces (i.e., cushion the foot), provide traction, enhance stability, and influence the motions of the foot, for example.

For purposes of reference in the following discussion, footwear 10 may be divided into three general regions: a forefoot region 11, a midfoot region 12, and a heel region 13. Forefoot region 11 generally includes portions of footwear 10 corresponding with the toes and the joints connecting the metatarsals with the phalanges. Midfoot region 12 generally includes portions of footwear 10 corresponding with an arch area of the foot. Heel region 13 generally corresponds with rear portions of the foot, including the calcaneus bone. Footwear 10 also includes a lateral side 14 and a medial side 15, which extend through each of regions 11-13 and correspond with opposite sides of footwear 10. More particularly, lateral side 14 corresponds with an outside area of the foot (i.e. the surface that faces away from the other foot), and medial side 15 corresponds with an inside area of the foot (i.e., the surface that faces toward the other foot). Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to upper 20, sole structure 30, and individual elements thereof.

Upper 20 is depicted as having a substantially conventional configuration formed from a variety of elements (e.g., textiles, polymer sheet layers, polymer foam layers, leather, synthetic leather) that are stitched, bonded, or otherwise joined together to provide a structure for receiving and securing the foot relative to sole structure 30. The various elements of upper 20 define a void 21, which is a generally hollow area of footwear 10 with a shape of the foot, that is intended to receive the foot. As such, upper 20 extends along the lateral side of the foot, along the medial side of the foot, over the foot, around a heel of the foot, and under the foot. Access to void 21 is provided by an ankle opening 22 located in at least heel region 13. A lace 23 extends through various lace apertures 24 and permits the wearer to modify dimensions of upper 20 to accommodate the proportions of the foot. More particularly, lace 23 permits the wearer to tighten upper 20 around the foot, and lace 23 permits the wearer to loosen upper 20 to facilitate entry and removal of the foot from void 21 (i.e., through ankle opening 22). As an alternative to lace apertures 24, upper 20 may include other lace-receiving elements, such as loops, eyelets, hooks, and D-rings. In addition, upper 20 includes a tongue 25 that extends between void 21 and lace 23 to enhance the comfort and adjustability of footwear 10. In some configurations, upper 20 may incorporate other elements, such as reinforcing members, aesthetic features, a heel counter that limits heel movement in heel region 13, a wear-resistant toe guard located in forefoot region 11, or indicia (e.g., a trademark) identifying the manufacturer. Accordingly, upper 20 is formed from a variety of elements that form a structure for receiving and securing the foot.

The primary elements of sole structure 30 are a midsole 31, a fluid-filled chamber 32, an outsole 33, and a sockliner 34. Midsole 31 may be formed from a polymer foam material, such as polyurethane or ethylvinylacetate, that encapsulates chamber 32. In addition to the polymer foam material and chamber 32, midsole 31 may incorporate one or more additional footwear elements that enhance the comfort, performance, or ground reaction force attenuation properties of footwear 10, including plates, moderators, lasting elements, or motion control members, for example. Although absent in some configurations, outsole 33 is secured to a lower surface of midsole 31 and may be formed from a rubber material that provides a durable and wear-resistant surface for engaging the ground. In addition, outsole 33 may be textured to enhance the traction (i.e., friction) properties between footwear 10 and the ground. Sockliner 34 is a compressible member located within void 21 and adjacent a lower surface of the foot to enhance the comfort of footwear 10.

Chamber Configuration

Chamber 32 is depicted individually in FIGS. 4-8 as having a configuration that is suitable for footwear applications. When incorporated into footwear 10, chamber 32 has a shape that fits within a perimeter of midsole 31 and extends through a majority of heel region 13. Chamber 32 also extends from lateral side 14 to medial side 15. Although the polymer foam material of midsole 31 is depicted as extending entirely around chamber 32, the polymer foam material of midsole 31 may expose portions of chamber 32. For example, chamber 32 may form a portion of (a) a sidewall of midsole 31 or (b) an upper or lower surface of midsole 31 in some configurations of footwear 10. When the foot is located within upper 20, chamber 32 extends under substantially all of a heel of the foot in order to attenuate ground reaction forces that are generated when sole structure 30 is compressed between the foot and the ground during various ambulatory activities, such as running and walking. In other configurations where chamber 32 has a different shape or structure, chamber 32 may extend under other areas of the foot or may extend throughout a length of sole structure 30.

The primary elements of chamber 32 are a barrier 40 and a tensile member 50. Barrier 40 is formed from a polymer material that defines a first or upper barrier portion 41, an opposite second or lower barrier portion 42, and a sidewall barrier portion 43 that extends around a periphery of chamber 32 and between barrier portions 41 and 42. In addition, portions 41-43 (a) form an exterior of chamber 32, (b) define an interior void 44 that receives both a pressurized fluid and tensile member 50, and (c) provide a durable and sealed structure for retaining the pressurized fluid within chamber 32. Tensile member 50 is located within interior void 44 and includes a first or upper layer 51, an opposite second or lower layer 52, and a plurality of connecting members 53 that extend between layers 51 and 52 and are arranged in various substantially parallel rows. Whereas upper layer 51 is secured to an inner surface of upper barrier portion 41, lower layer 52 is secured to an inner surface of lower barrier portion 42. Examples of chambers that include tensile members are disclosed in (a) U.S. patent application Ser. No. 12/123,612, which was filed in the U.S. Patent and Trademark Office on 20 May 2008 and entitled Fluid-Filled Chamber With A Textile Tensile Member; (b) U.S. patent application Ser. No. 12/123,646, which was filed in the U.S.

Patent and Trademark Office on 20 May 2008 and entitled Contoured Fluid-Filled Chamber With A Tensile Member; and (c) U.S. Pat. No. 7,070,845 to Thomas, et al., each of which is incorporated herein by reference.

Tensile member 50 is formed from a spacer textile material. A manufacturing process, which will be discussed in greater detail below, may be utilized to form tensile member 50 from at least one yarn. That is, the manufacturing process may knit or otherwise manipulate one or more yarns to (a) form layers 51 and 52 to have the configuration of knitted elements, (b) extend connecting members 53 between layers 51 and 52, and (c) join connecting members 53 to each of layers 51 and 52. Each of connecting members 53 may, therefore, be sections or segments of one or more yarns that extend between and join layers 51 and 52.

Figure 5:
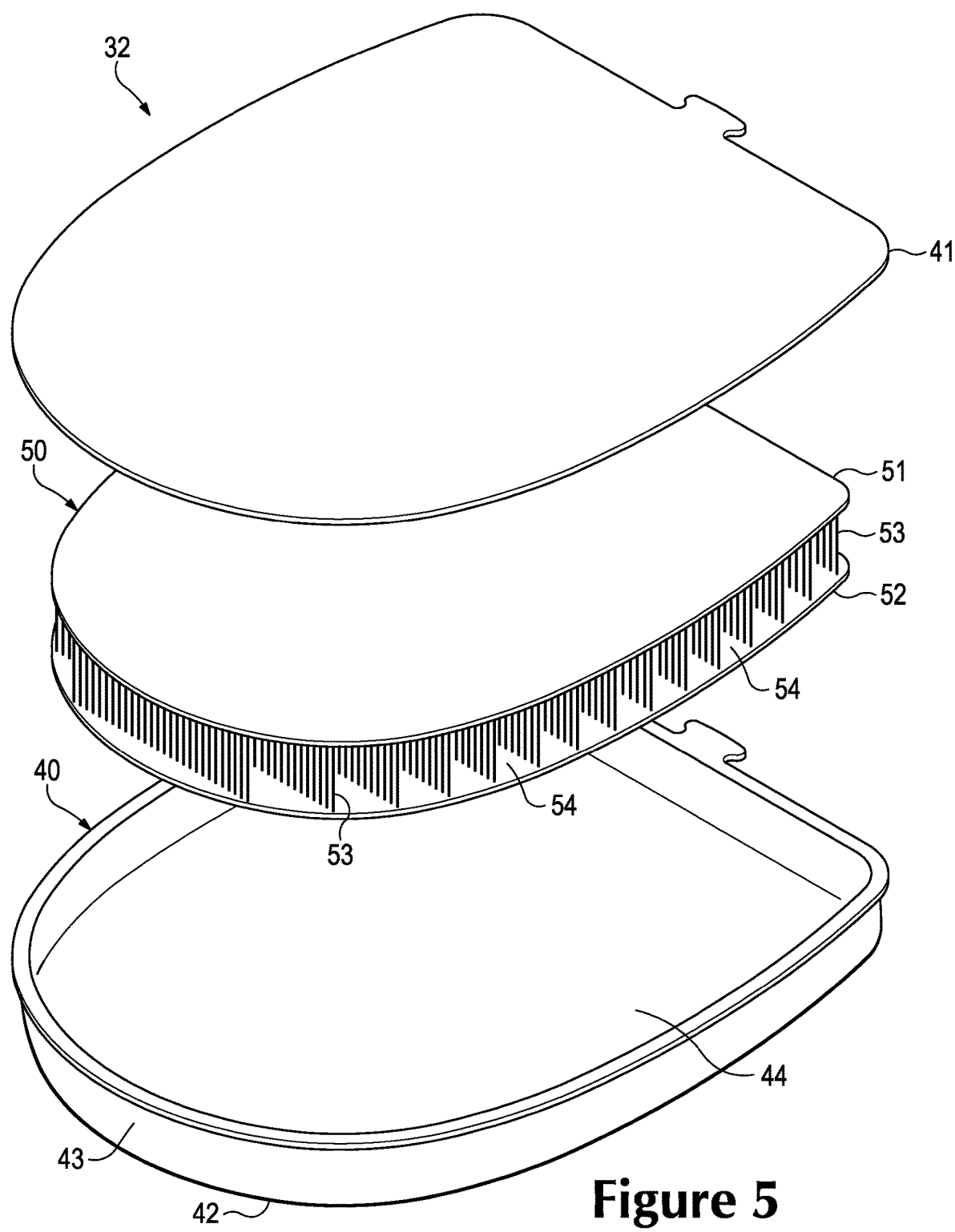
FIG. 5 is an exploded perspective view of the chamber.
Figure 6:
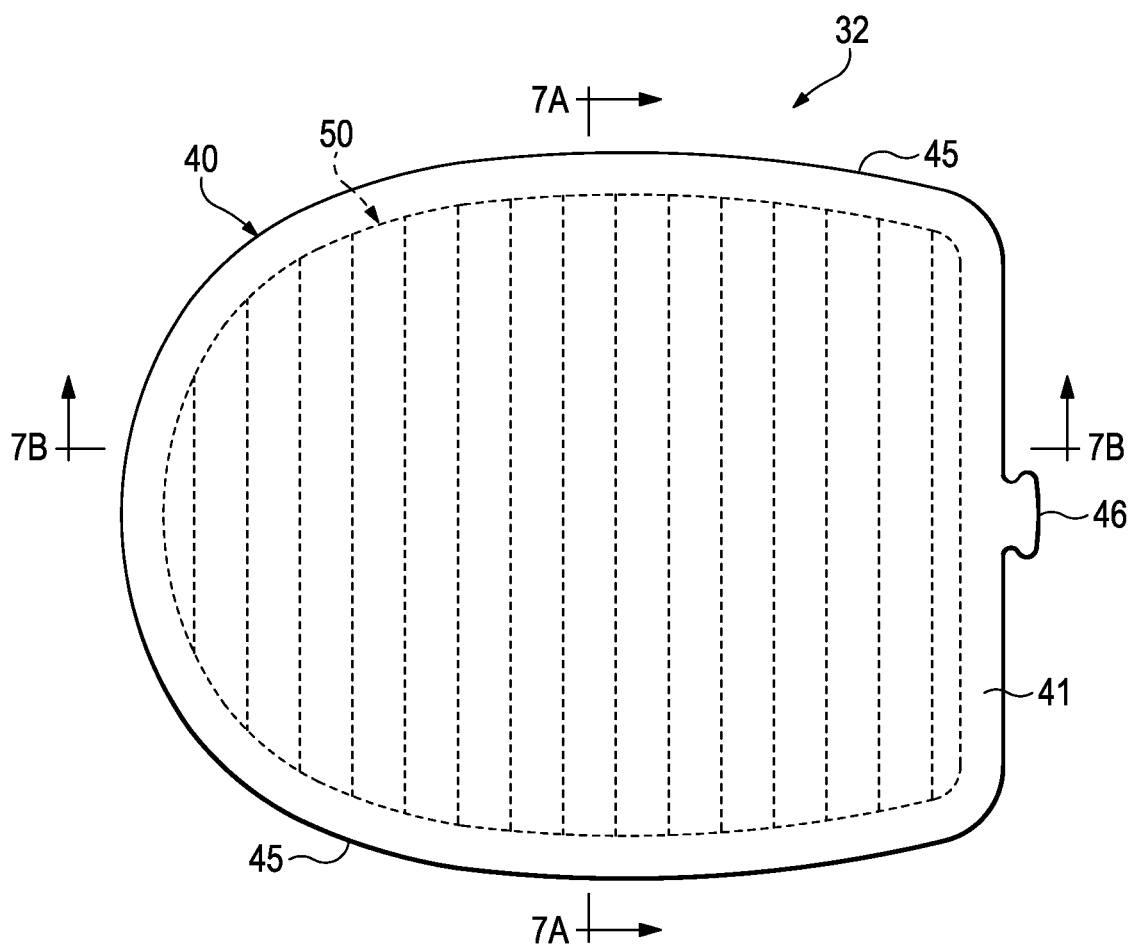
FIG. 6 is a plan view of the chamber.
Figure 7A:
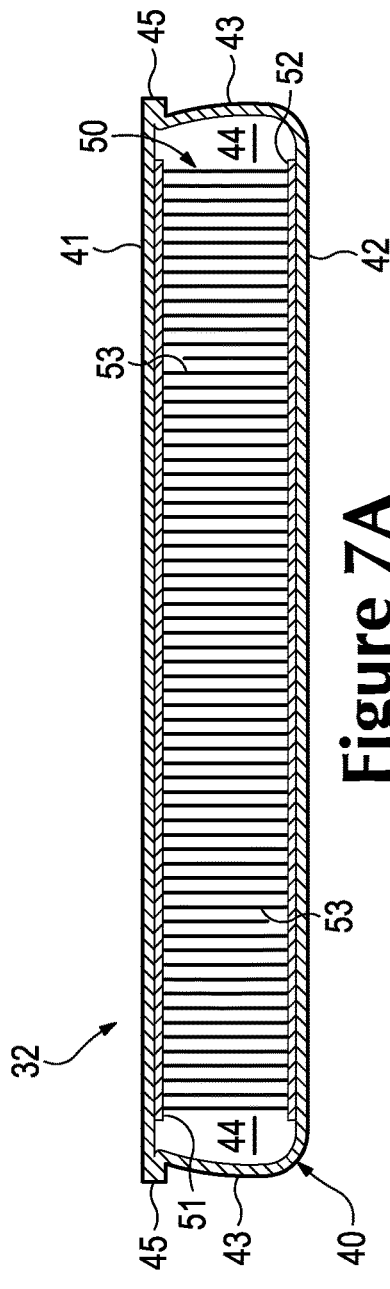
FIGS. 7A and 7B are cross-sectional views of the chamber, as defined by section lines 7A and 7B in FIG. 6.
Figure 7B:
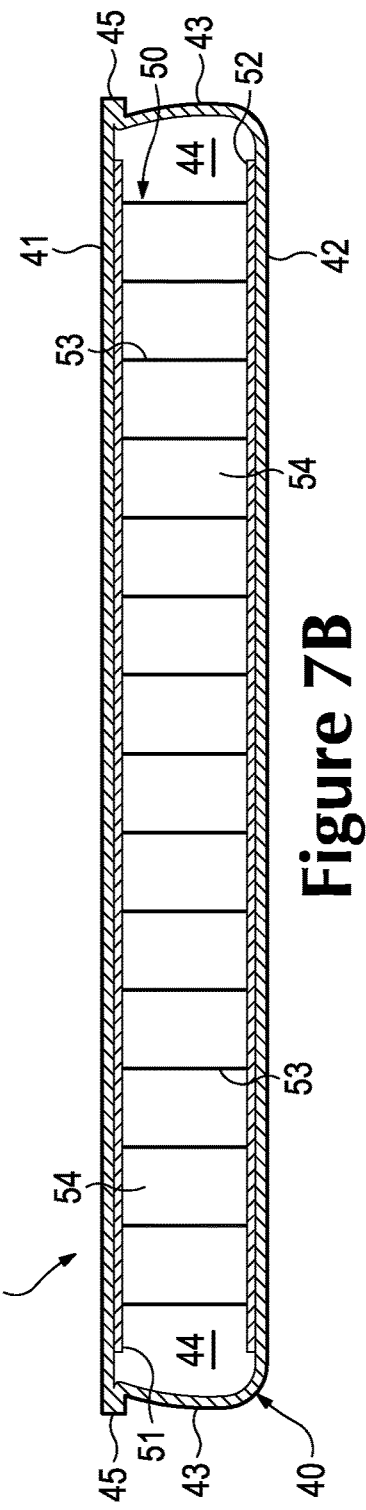
Figure 8:
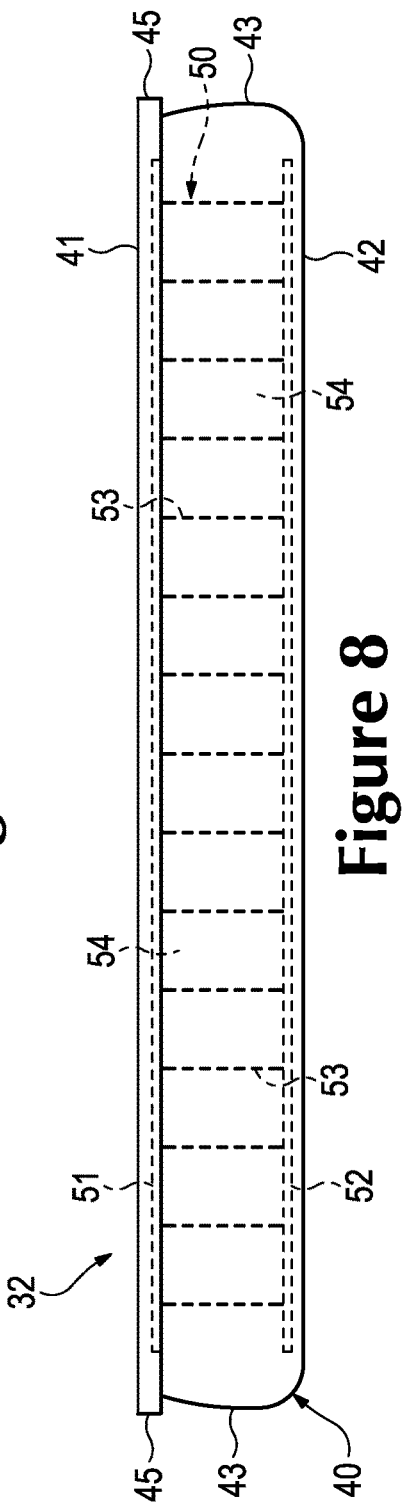
FIG. 8 is a side elevational view of the chamber.

Connecting members 53 form a series of rows that are separated by various spaces 54, as depicted in FIGS. 5, 7B, and 8. The presence of spaces 54 provides tensile member 50 with increased compressibility, lesser weight, and more efficient manufacture in comparison to other tensile members that utilize continuous connecting members without spaces. The rows formed by connecting members 53 are substantially parallel to each other and equidistant from each other. That is, a distance between two adjacent rows formed by connecting members 53 may be the same as a distance between two other adjacent rows formed by connecting members 53. In general, therefore, the rows formed by connecting members 53 are substantially parallel to each other and distributed at substantially equal distances across tensile member 50.

A manufacturing process for chamber 32 generally involves (a) securing a pair of polymer sheets, which form barrier portions 41-43, to opposite sides of tensile member 50 (i.e., to layers 51 and 52) and (b) forming a peripheral bond 45 that joins a periphery of the polymer sheets and extends around sidewall barrier portion 43. One or both of the polymer sheets forming barrier portions 41-43 may also be thermoformed, molded, or otherwise shaped during the process. A pressurized fluid is then injected into interior void 44 through an inlet 46, which is then sealed. The fluid exerts an outward force upon barrier 40, which tends to separate barrier portions 41 and 42. Tensile member 50, however, is secured to each of barrier portions 41 and 42 in order to retain the intended shape (e.g., generally planar shape) of chamber 32 when pressurized. More particularly, connecting members 53 extend across the interior void and are placed in tension by the outward force of the pressurized fluid upon barrier 40, thereby preventing barrier 40 from expanding or bulging outward. Whereas peripheral bond 45 joins the polymer sheets to form a seal that prevents the fluid from escaping, tensile member 50 prevents barrier 40 from expanding outward or otherwise distending due to the pressure of the fluid. That is, tensile member 50 effectively limits the expansion of barrier portions 41 and 42 to retain the intended shape of chamber 32. Although chamber 32 is depicted as having a generally planar shape, chamber 32 (i.e., barrier portions 41 and 42) may also be contoured, as disclosed in U.S. patent application Ser. Nos. 12/123,612 and 12/123,646, which were mentioned above and are incorporated herein by reference.

In order to facilitate bonding between tensile member 50 and barrier 40, polymer bonding layers may be applied to each of layers 51 and 52. When heated, the bonding layers soften, melt, or otherwise begin to change state so that contact with barrier portions 41 and 42 induces material from each of barrier 40 and the bonding layers to intermingle or otherwise join with each other. Upon cooling, the bonding layers are permanently joined with barrier 40, thereby joining barrier 40 and tensile member 50. In some configurations, thermoplastic threads or strips may be present within layers 51 and 52 to facilitate bonding with barrier 40, as disclosed in U.S. Pat. No. 7,070,845, which was mentioned above and is incorporated herein by reference. An adhesive may also be utilized to assist with securing barrier 40 and tensile member 50.

A wide range of polymer materials may be utilized for barrier 40. In selecting materials for barrier 40, engineering properties of the material (e.g., tensile strength, stretch properties, fatigue characteristics, and dynamic modulus) and the ability of the material to prevent diffusion of the fluid contained by barrier 40 may be considered. When formed of thermoplastic urethane, for example, barrier 40 may have a thickness of approximately 1.0 millimeter, but the thickness may range from 0.2 to 4.0 millimeters or more, for example. In addition to thermoplastic urethane, examples of polymer materials that may be suitable for barrier 40 include polyurethane, polyester, polyester polyurethane, and polyether polyurethane. Barrier 40 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein layers include ethylene-vinyl alcohol copolymer, thermoplastic polyurethane, and a regrind material of the ethylene-vinyl alcohol copolymer and thermoplastic polyurethane. Another suitable material for barrier 40 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al.

The fluid within chamber 32 may be pressurized between zero and three-hundred-fifty kilopascals (i.e., approximately fifty-one pounds per square inch) or more. In addition to air and nitrogen, the fluid may include octafluorapropane or be any of the gasses disclosed in U.S. Pat. No. 4,340,626 to Rudy, such as hexafluoroethane and sulfur hexafluoride. In some configurations, chamber 32 may incorporate a valve or other structure that permits the wearer to adjust the pressure of the fluid.

Spacer Textile Material

Figure 9:
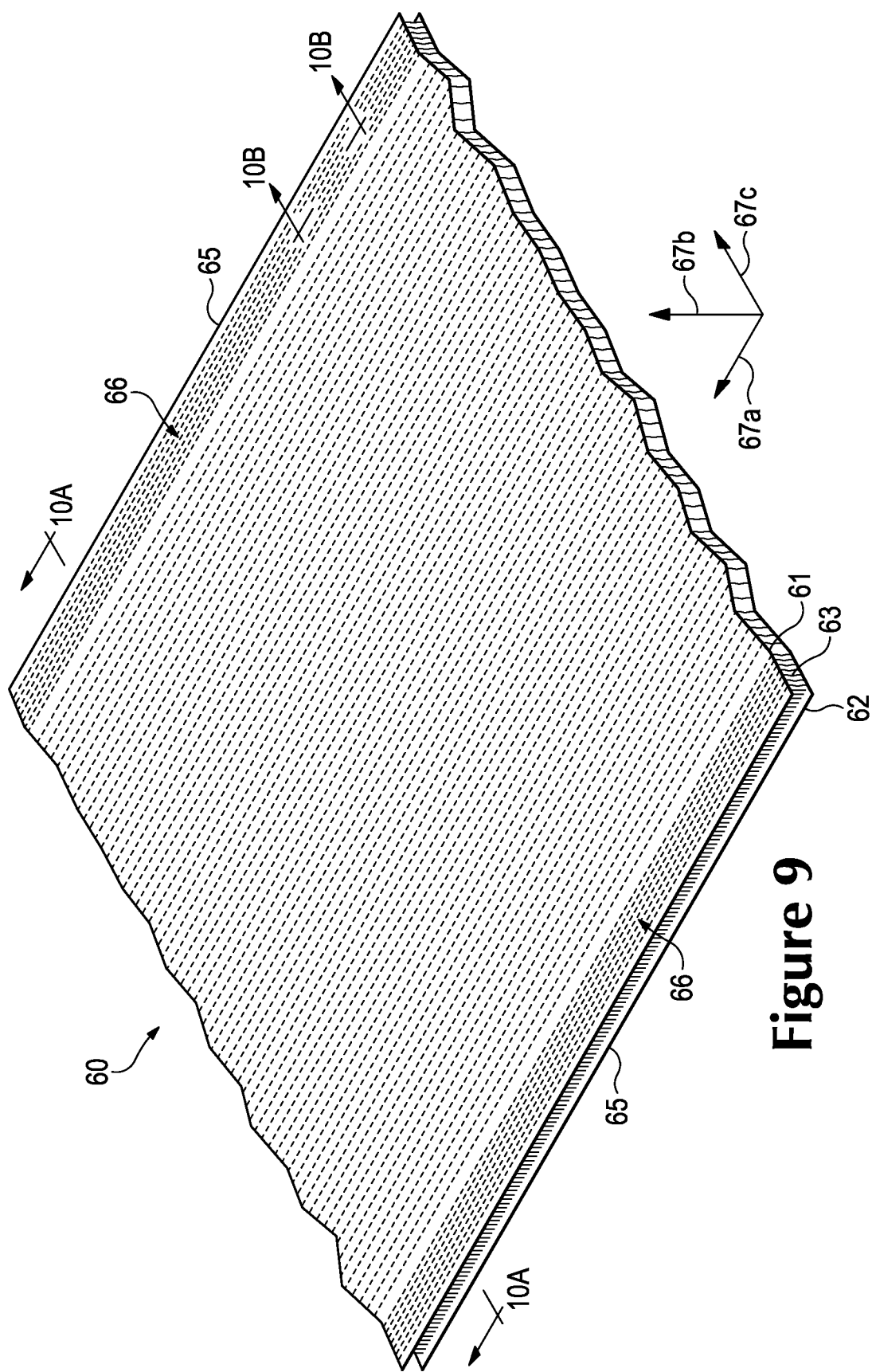
FIG. 9 is a perspective view of a spacer textile material.

A spacer textile material 60 (e.g., a spacer mesh material or spacer-knit textile material) is depicted in FIGS. 9, 10A, and 10B. Spacer textile material 60 may be utilized to form tensile member 50. More particularly, an element having the shape of tensile member 50 may be cut or otherwise removed from spacer textile material 60 to form tensile member 50. In general, therefore, portions of spacer textile material 60 have a configuration that is similar to tensile member 50. Spacer textile material 60 includes a first layer 61, a second layer 62 that is at least partially coextensive with first layer 61, and a plurality of connecting members 63 that extend between and join layers 61 and 62. Connecting members 63 are arranged to form a series of rows that are separated by various spaces 64. The rows formed by connecting members 63 are substantially parallel to each other and distributed at substantially equal distances across tensile member 60. Spaces 64 are areas within spacer textile material 60 where connecting members 63 are absent, typically areas between the rows formed by connecting members 63. Spacer textile material 60 also defines a pair of opposite edges 65, which are also edges of layers 61 and 62. Each of edges 65 are substantially parallel to the rows formed by connecting members 63.

Although tensile member 50 may be cut or otherwise removed from spacer textile material 60, a comparison between FIGS. 7B and 10A will reveal that (a) connecting members 53 are straight in FIG. 7B and (b) connecting members 63 are wavy or otherwise non-linear in FIG. 10A. As noted above, connecting members 53 extend across the interior void of chamber 32 and are placed in tension by the outward force of the pressurized fluid upon barrier 40. The tension in connecting members 53 imparts, therefore, the straight structure shown in FIG. 7B. Given that no comparable tension is placed upon spacer textile material 60, connecting members 63 are loose, partially collapsed, or otherwise non-tensioned to impart the wavy or otherwise non-linear structure shown in FIG. 10A.

An advantage of spacer textile 60 relates to the presence of two stabilization structures 66. Although stabilization structures 66 may have various configurations, as discussed below, stabilization structures 66 are depicted in FIGS. 9, 10A, and 10B as areas of spacer textile 60 with a relatively high concentration of connecting members 63. As an example of location, FIGS. 9 and 10A depict stabilization structures 66 as being located adjacent to edges 65. In comparison with the various rows formed by connecting members 63 located in a central area of spacer textile material 60, stabilization structures 66 have greater width and a greater concentration or density of connecting members 63. In some configurations, therefore, stabilization structures 66 may be rows of connecting members 63 with a greater width and a greater concentration. In general, the two stabilization structures 66 hold layers 61 and 62 in proper alignment with each other and resist forces that would otherwise shift layers 61 and 62. The manner in which stabilization structures 66 retain the proper alignment of layers 61 and 62 will be discussed in greater detail below.

For purposes of reference in the following discussion, various directions corresponding with a length, height, and width of spacer textile material 60 will now be defined. Various axes defining a length direction 67a, a height direction 67b, and a width direction 67c is depicted in FIG. 9. Length direction 67a generally corresponds with a length of spacer textile material 60 and extends in a direction that is (a) parallel to layers 61 and 62 and (b) parallel to the various rows formed by connecting members 63. As such, each of the rows formed by connecting members 63 are oriented to extend along length direction 67a. Height direction 67b generally corresponds with a height of spacer textile material 60 and extends in a direction that is perpendicular to layers 61 and 62. As such, individual connecting members 63 extend along height direction 67b. Due to the presence of stabilization structures 66, areas where each individual connecting member 63 is joined to first layer 61 and second layer 62 are aligned in height direction 67b. Width direction 67c generally corresponds with a width of spacer textile material 60 and extends in a direction that is (a) parallel to layers 61 and 62 and (b) perpendicular to the various rows formed by connecting members 63. As such, width direction 67c is oriented in a direction that extends between edges 65.

The cross-section of FIG. 10A depicts a section of spacer textile material 60 that extends along height direction 67b and width direction 67c. As a result, FIG. 10A depicts a cross-section of a height and a width of spacer textile material 60. Additionally, the widths of various rows formed by connecting members 63 and the various spaces 64 located between connecting members 63 are depicted. More particularly, FIG. 10A depicts multiple row widths 68a, space widths 68b, and stabilization widths 68c. Row widths 68a represent the width of an individual row formed by various connecting members 63. Space widths 68b represent the width of an individual space 64 between two adjacent rows formed by connecting members 63. Although the distance associated with each of space widths 68b may vary significantly, space widths 68b are generally greater distances than row widths 68a. Stabilization widths 68c represent the width of each stabilization structure 66. Although the distance associated with each of stabilization widths 68c may vary significantly, stabilization widths 68c are generally greater distances than row widths 68a and space widths 68b. In general, therefore, the widths of stabilization structures 66 are greater than the widths of spaces 64, and the widths of spaces 64 are greater than the widths of the rows formed by connecting members 63. Although this relationship between the various widths provides a suitable structure to spacer textile material 60, other relationships between the widths may be suitable for other configurations of spacer textile materials.

Based upon the above discussion, the distance associated with row widths 68a is generally less than the distance associated with space widths 68b, and the distance associated with space widths 68b is generally less than the distance associated with stabilization widths 68c. As noted above, the presence of spaces 54 provides tensile member 50 with increased compressibility, lesser weight, and more efficient manufacture in comparison to other tensile members that utilize continuous connecting members without spaces. Given that tensile member 50 comes from spacer textile material 60, the presence of spaces 64 provides portions of spacer textile material 60 with increased compressibility, lesser weight, and more efficient manufacture in comparison to other spacer textile materials that utilize continuous connecting members without spaces. Moreover, by forming space widths 68b to be larger than row widths 68a, greater compressibility and lesser weight is imparted to spacer textile material 60. Also as noted above, an advantage of spacer textile 60 relates to the presence of stabilization structures 66, which retain the proper alignment of layers 61 and 62. By forming stabilization widths 68c to have be relatively large (e.g., larger than space widths 68b), the ability of each stabilization structure 66 to retain alignment of layers 61 and 62 is enhanced.

In some configurations of spacer textile material 60, the rows formed by connecting members 63 have a width formed by a single connecting member 63, thereby having a width of a single section of yarn. The widths of stabilization structures 66, however, may include multiple connecting members 63. In some configurations, the rows formed by connecting members 63 rows have a width formed by less than five connecting members 63 or the yarn sections, and stabilization structures 66 have a width formed by at least five of connecting members 63 or the yarn sections. As such, stabilization structures 66 have sufficient width to resist misalignment of layers 61 and 62. In some configurations, a width of stabilization structures 66 may be at least five times or ten times a width of each row formed by connecting members 63 to also impart sufficient width to resist misalignment of layers 61 and 62.

A general process for manufacturing spacer textile material 60 is depicted in FIG. 11. In the process, one or more yarns 71 are fed into a conventional knitting apparatus 72, which mechanically-manipulates yarns 71 to form each of layers 61 and 62 and connecting members 63. As such, layers 61 and 62 may be knitted layers, and connecting members 63 may be sections of at least one yarn that extend between layers 61 and 62. Moreover, the process forms spaces 64, edges 65, and stabilization structures 66. Once formed, spacer textile material 60 exits knitting apparatus 72 and is collected on a roll 73. After a sufficient length of spacer textile material 60 is collected, roll 73 may be shipped or otherwise transported to a manufacturer of chamber 32, otherwise utilized to form tensile member 50 of chamber 32, or used for other purposes. Although not always performed, spacer textile material 60 may be subjected to various finishing operations (e.g., dying, fleecing) prior to being collected on roll 73.

Figure 12A:
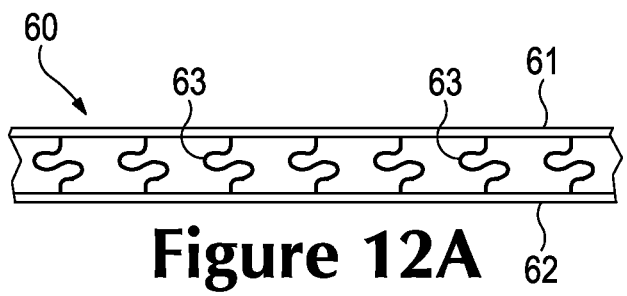
FIGS. 12A and 12B are side elevational views of portions of the spacer textile material, as defined in FIG. 11.
Figure 12B:
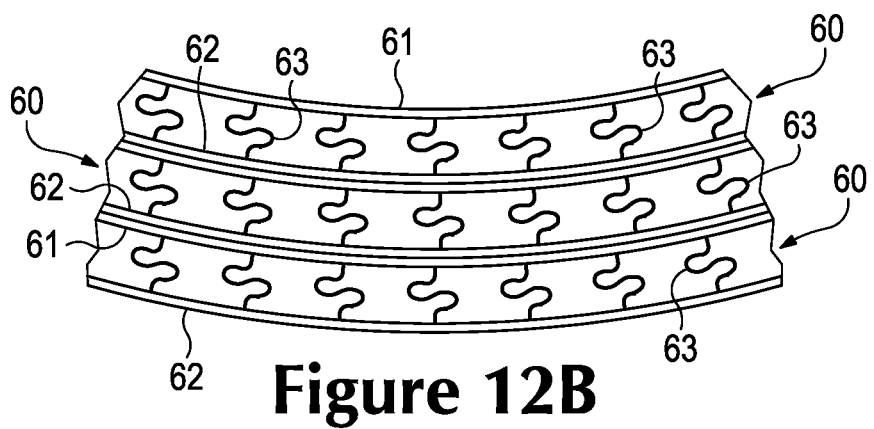

When spacer textile material 60 is formed by knitting apparatus 72, layers 61 and 62 are properly aligned with each other. That is, a point on first layer 61 where a particular connecting member 63 is joined to first layer 61 is aligned with a point on second layer 62 where that particular connecting member 63 is joined to second layer 62, as depicted in FIG. 12A. In other words, layers 61 and 62 are not shifted or misaligned. Although the various connecting members 63 may not be straight and exhibit a wavy or crumpled configuration, the points on layers 61 and 62 are aligned. When spacer textile material 60 is collected onto roll 73, connecting members 63 may bend, crush, or crumple to an even greater degree, but a point on first layer 61 where a particular connecting member 63 is joined to first layer 61 remains aligned with a point on second layer 62 where that particular connecting member 63 is joined to second layer 62, as depicted in FIG. 12B. As such, layers 61 and 62 do not shift or become misaligned with each other as a result of being collected onto roll 73. Additionally, when tensile member 50 is cut or otherwise removed from spacer textile material 60, layers 51 and 52 remain aligned with each other.

Figure 13A:
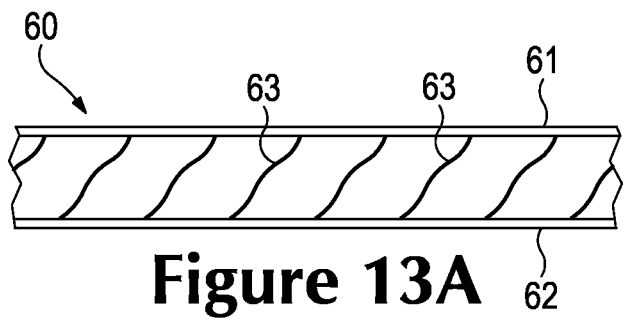
FIGS. 13A and 13B are side elevational views corresponding with FIGS. 12A and 12B and depicting a shifted state of the spacer textile material.
Figure 13B:
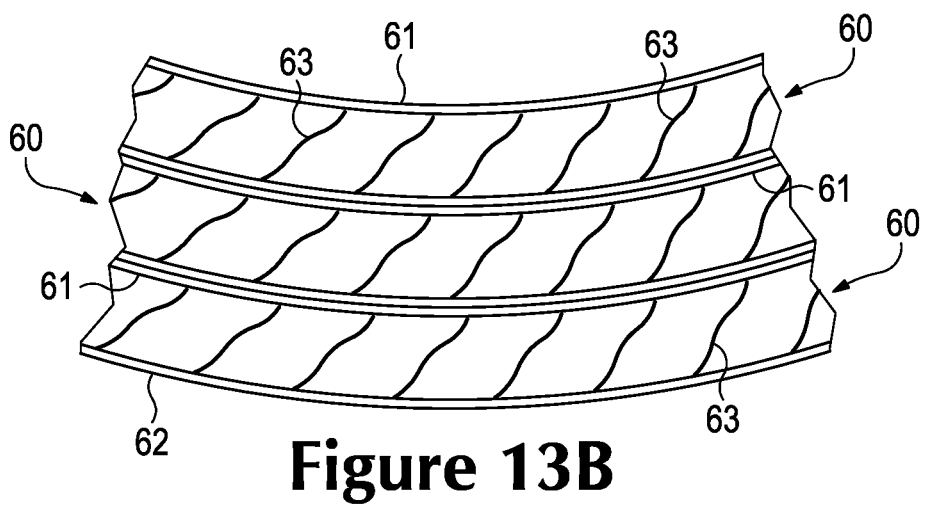

One factor that assists with keeping layers 61 and 62 aligned following the manufacturing of spacer textile material 60 relates to the presence of stabilization structures 66 in spacer textile material 60. In general, stabilization structures 66 hold layers 61 and 62 in proper alignment with each other and resist forces that would otherwise shift layers 61 and 62. More particularly, the density of connecting members 63 in stabilization structures 66 limits the ability of layers 61 and 62 to shift relative to each other. In the absence of stabilization structures 66, layers 61 and 62 may shift in the manner depicted in FIGS. 13A and 13B. More particularly, a point on first layer 61 where a particular connecting member 63 is joined to first layer 61 may be shifted or misaligned with a point on second layer 62 where that particular connecting member 63 is joined to second layer 62 when one or more of stabilization structures 66 are not incorporated into spacer textile material 60. It should also be noted that stabilization structures 66 may retain the alignment of layers 61 and 62 during the various finishing operations noted above. Accordingly, stabilization structures 66 impart the non-shifted configuration of FIGS. 12A and 12B (as well as FIGS. 10A and 10B), rather than allowing layers 61 and 62 to shift, as in the examples of FIGS. 13A and 13B.

An advantage of limiting the degree to which layers 61 and 62 shift relates to the resulting configuration of chamber 32. By retaining the alignment between layers 61 and 62, chamber 32 is formed with more consistency than those chambers with shifted or misaligned spacer textile materials. For example, if layers 51 and 52 of tensile member 50 were to shift, a shape of chamber 32 may be slightly distorted, as in FIG. 17A which will be discussed in more detail below. Moreover, shifting of layers 51 and 52 may increase the difficulty of centrally-locating tensile member 50 relative to each of barrier portions 41-43, which may (a) further distort the shape of chamber 32 and (b) decrease manufacturing efficiency.

Further Configurations

Figure 14A:
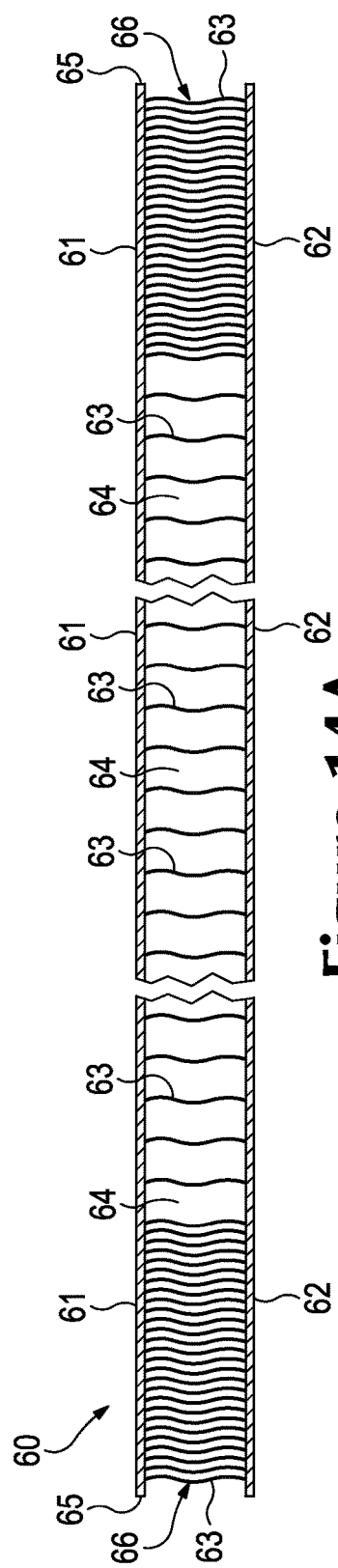
Figure 14B:
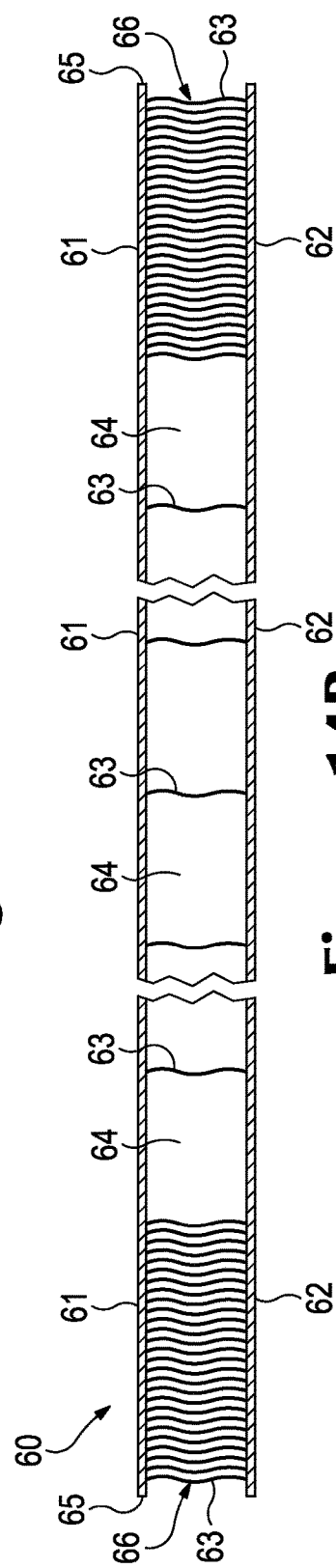
Figure 14C:
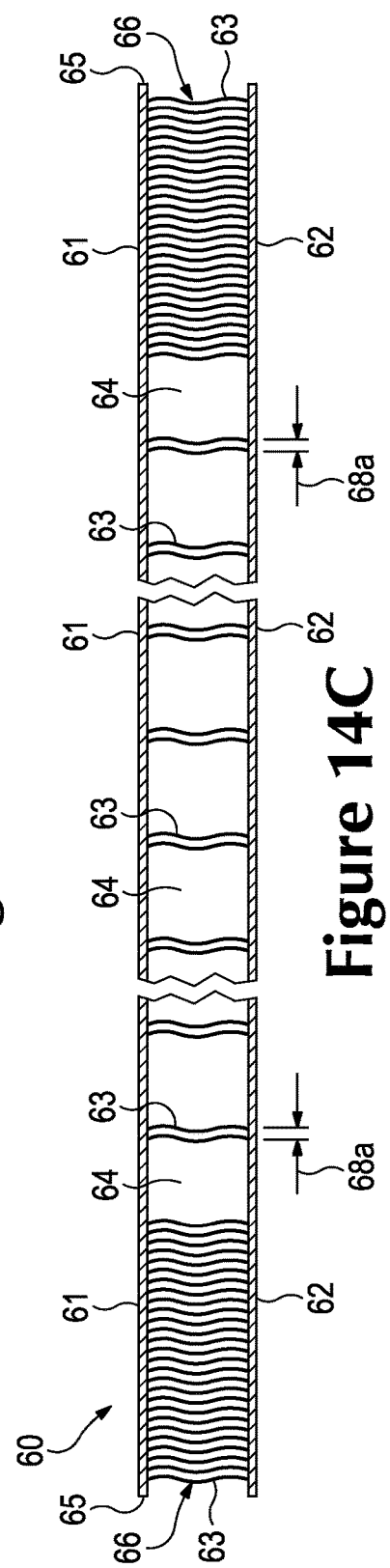

The structure of spacer textile material 60 discussed above is intended to provide an example of a suitable configuration for various products, in addition to footwear 10. Various other configurations for spacer textile material 60 may also be utilized to impart alignment between layers 61 and 62. Referring to FIG. 14A, for example, spacer textile material 60 has a greater number of rows formed by connecting members 63, resulting in an increase in the number of spaces 64. Moreover, while row width 68a and stabilization width 68c remain the same, space width 68b is decreased. A reverse configuration is depicted in FIG. 14B, wherein spacer textile material 60 has a lesser number of rows formed by connecting members 63, resulting in a decrease in the number of spaces 64. Moreover, while row width 68a and stabilization width 68c remain the same, space width 68b is increased. In each of the configurations discussed previously, the rows formed by connecting members 63 had a width formed by a single connecting member 63, thereby having a width of a single section of yarn. The rows formed by connecting members 63 may, however, be formed from multiple sections of yarn. For example, a row is formed by two connecting members 63 in FIG. 14C and four connecting members 63 in FIG. 14D.

In each of the configurations discussed previously, stabilization structures 66 are located adjacent to edges 65 and extend along edges 65, thereby being located at a periphery of spacer textile material 60. Referring to FIG. 14E, however, an additional stabilization structure 66 is located in a central area of spacer textile material 60, thereby being centered between edges 65. As another variation, FIG. 14F depicts a space 64 as extending between and separating two stabilization structures 66 adjacent to each of edges 65. As such, two stabilization structures 66 separated by one space 64 are located adjacent to one of edges 65, and two stabilization structures 66 separated by another space 64 are located adjacent to the other of edges 65.

Figure 14G:
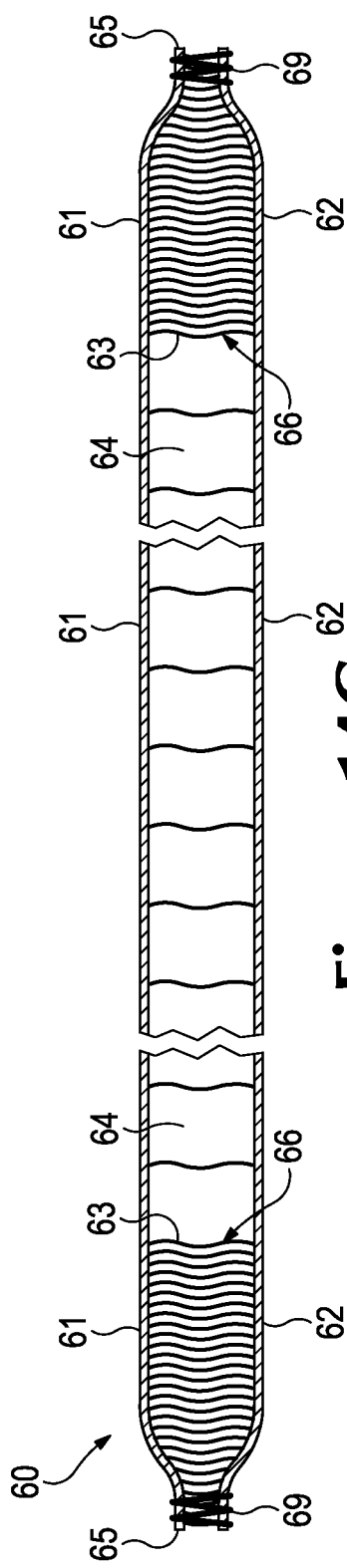
Figure 14H:
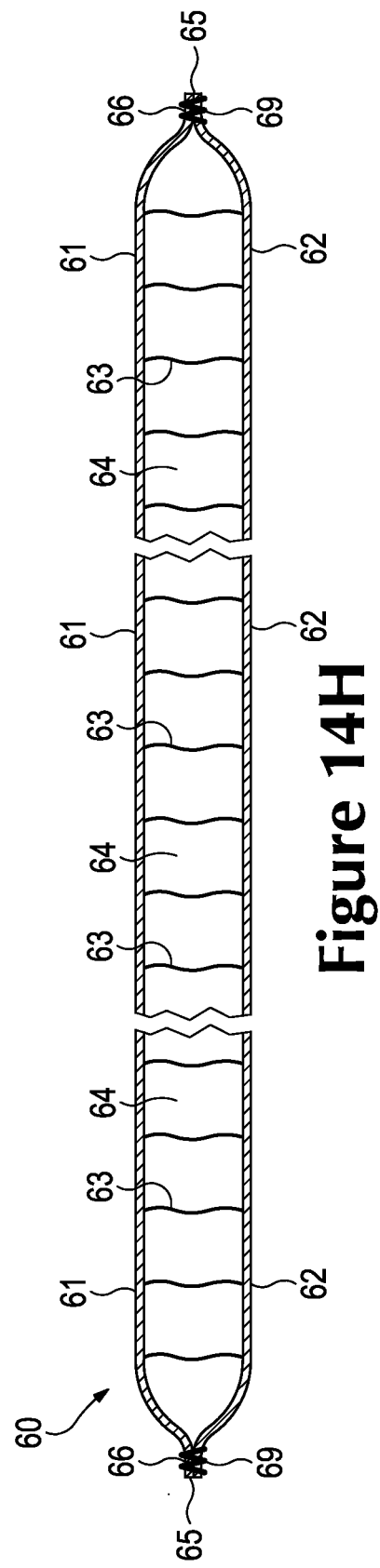

Forming stabilization structures 66 to have a greater concentration or density of connecting members 63 is one method of ensuring that layers 61 and 62 remain aligned following the manufacturing of spacer textile material 60. Referring to FIG. 14G, for example, stabilization structures 66 include joining strands 69 that effectively joins layers 61 and 62. More particularly, joining strands 69 may be stitching that draws layers 61 and 62 together and effectively secures layers 61 and 62 to each other within stabilization structures 66. Stitching or otherwise securing layers 61 and 62 to each other may be utilized, therefore, to supplement the greater concentration or density of connecting members 63 and ensure that layers 61 and 62 remain aligned. Joining strands 69 may be any filament, yarn, or thread formed from nylon, polyester, elastane (i.e., spandex), cotton, or silk, for example. A similar result may be obtained through the use of adhesives, staples, or other structures that may limit movement of layers 61 and 62. Although joining strands 69 may supplement the use of connecting member 63 in stabilization structures 66, joining strands 69 may be used alone as stabilization structures 66, as depicted in FIG. 14H.

Based upon the above discussion, each of spacer textile material 60 and stabilization structures 66 may have various configurations. Although each of these configurations are discussed separately, many of the concepts presented above may be combined to impart specific properties or otherwise ensure that spacer textile material 60 and stabilization structures 66 are optimized for a particular purpose or product. As noted above, stabilization structures 66 retain the proper alignment of layers 61 and 62 in spacer textile material 60. It should be emphasized, however, that forming stabilization structures 66 to have a greater concentration or density of connecting members 63 is one method of ensuring that layers 61 and 62 remain aligned following the manufacturing of spacer textile material 60. Moreover, the use of joining strands 69, adhesives, or staples are also only examples, and other structures or methods may also be employed.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

What is claimed is:

1. A spacer textile material comprising a first layer, a second layer, and a plurality of connecting members extending between and joining the first layer and the second layer, the connecting members forming rows that are separated by spaces, the rows having a width that is less than a width of the spaces, and the connecting members forming a first stabilizing row and a second stabilizing row where the first layer and the second layer are parallel and drawn toward one another;
    wherein the first layer and the second layer define a first edge and an opposite second edge of the spacer textile material; and
    wherein the first stabilizing row is located adjacent to the first edge and the second stabilizing row is located adjacent to the second edge.

2. The spacer textile material of claim 1, wherein a concentration of connecting members within the first stabilizing row and the second stabilizing row is evenly spaced apart and greater than a concentration of the connecting members at each of the rows of connecting members.

3. The spacer textile material of claim 1, wherein the first layer and the second layer are drawn toward one another by stitching at the first stabilizing row and at the second stabilizing row.

4. The spacer textile material of claim 1, wherein the first layer and the second layer are joined at the first stabilizing row and at the second stabilizing row.

5. The spacer textile material of claim 1, wherein the spacer textile material is a knitted textile and the first layer, the second layer, and the connecting members are formed from at least one yarn.

6. The spacer textile material of claim 5, wherein the connecting members are sections of at least one yarn.

7. The spacer textile material of claim 1, wherein the rows are located between the first stabilizing row and the second stabilizing row.

8. The spacer textile material of claim 1, further comprising a third stabilizing row located in a central area of the spacer textile material and between the first edge and the second edge.

9. The spacer textile material of claim 8, wherein a first series of the rows is located between the first stabilizing row and the third stabilizing row and a second series of the rows is located between the second stabilizing row and the third stabilizing row.

10. The spacer textile material of claim 1, wherein a width of the first stabilizing row and a width of the second stabilizing row is greater than a width of each row of the connecting members.

11. A spacer textile material comprising a first layer, a second layer, and a plurality of connecting members extending between and joining the first layer and the second layer, the connecting members forming rows that are separated by spaces, the rows having a width that is less than a width of the spaces, and the connecting members forming a first stabilizing row and a second stabilizing row where the first layer and the second layer are parallel to one another, drawn together, and joined in direct contact with one another;
    wherein the first layer and the second layer define a first edge and an opposite second edge of the spacer textile material; and
    wherein the first stabilizing row is located adjacent to the first edge and the second stabilizing row is located adjacent to the second edge.

12. The spacer textile material of claim 11, wherein a concentration of connecting members within the first stabilizing row and the second stabilizing row is evenly spaced apart and greater than a concentration of the connecting members at each of the rows of connecting members.

13. The spacer textile material of claim 11, wherein the first layer and the second layer are joined to one another by stitching at the first stabilizing row and at the second stabilizing row.

14. The spacer textile material of claim 11, wherein the spacer textile material is a knitted textile and the first layer, the second layer, and the connecting members are formed from at least one yarn.

15. The spacer textile material of claim 14, wherein the connecting members are sections of at least one yarn.

16. The spacer textile material of claim 11, wherein the rows are located between the first stabilizing row and the second stabilizing row.

17. The spacer textile material of claim 11, further comprising a third stabilizing row located in a central area of the spacer textile material and between the first edge and the second edge.

18. The spacer textile material of claim 17, wherein a first series of the rows is located between the first stabilizing row and the third stabilizing row and a second series of the rows is located between the second stabilizing row and the third stabilizing row.

19. The spacer textile material of claim 11, wherein a width of the first stabilizing row and a width of the second stabilizing row is greater than a width of each row of the connecting members.

20. An article of footwear incorporating the spacer textile material of claim 11.

* * * * *